United States Patent [19]

Nelson et al.

[11] Patent Number: 4,964,691
[45] Date of Patent: Oct. 23, 1990

[54] OPTICAL FIBER CABLE HAVING OPTICAL FIBERS WITH VARIOUS LENGTHS

[75] Inventors: John C. Nelson; Kenneth E. Cornelison, both of Hickory, N.C.

[73] Assignee: Alcatel NA, Inc., Hickory, N.C.

[21] Appl. No.: 356,757

[22] Filed: May 24, 1989

[51] Int. Cl.$^5$ .............................................. G02B 6/44
[52] U.S. Cl. .................................................. 350/96.23
[58] Field of Search ................. 350/96.23, 96.24, 96.3

[56] References Cited

U.S. PATENT DOCUMENTS

| | | | |
|---|---|---|---|
| 4,078,853 | 3/1978 | Kempf et al. | 350/96.23 |
| 4,557,560 | 12/1985 | Bohannon, Jr. et al. | 350/96.23 |
| 4,695,128 | 9/1987 | Zimmerman et al. | 350/96.23 |
| 4,725,123 | 2/1988 | Anelli et al. | 350/96.23 |
| 4,783,954 | 11/1988 | Akre | 350/96.23 |
| 4,786,137 | 11/1988 | Ganelison et al. | 350/96.23 |
| 4,822,132 | 4/1989 | Oestreich | 350/96.23 |

FOREIGN PATENT DOCUMENTS

| | | | |
|---|---|---|---|
| 2538565 | 6/1984 | France | 350/96.33 |
| 62-194209 | 8/1987 | Japan | 350/96.23 |

OTHER PUBLICATIONS

"Fiber Optic Link for Cable Watchers"; Optical Spectra; vol. 13, No. 8; Aug. 1979.

Primary Examiner—William L. Sikes
Assistant Examiner—John Ngo
Attorney, Agent, or Firm—Peter C. Van Der Sluys

[57] ABSTRACT

An optical fiber cable having a predetermined length includes a plurality of optical fibers, each fiber having first and second ends. The first ends of the fibers are located coincidental with a first end of the optical fiber cable. The optical fibers are provided with differing lengths so that the second ends of the optical fibers are disposed at different locations along the length of the optical fiber cable. Indicia are provided on the cable to indicate the locations of the second ends of the fibers.

20 Claims, 1 Drawing Sheet

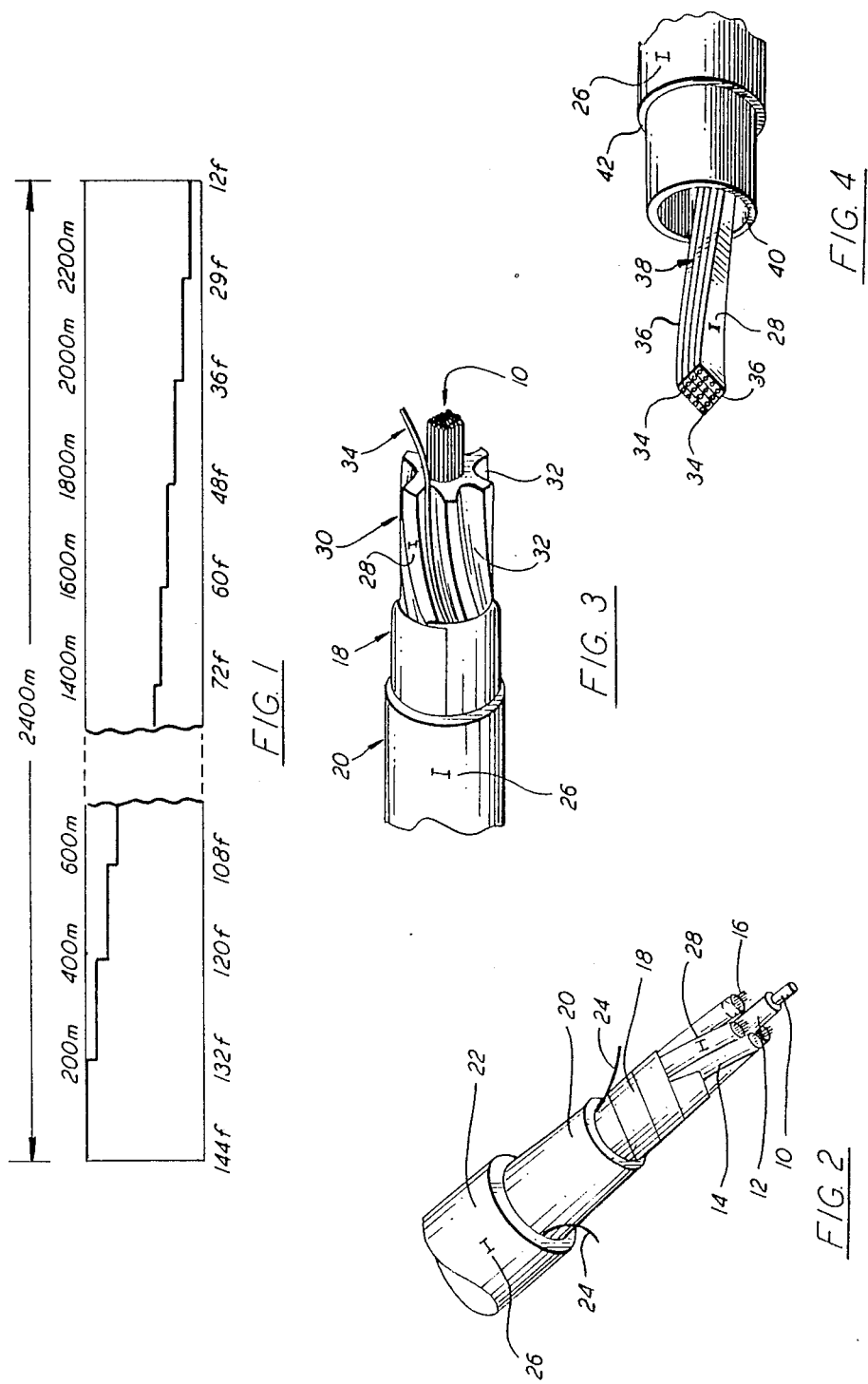

OPTICAL FIBER CABLE HAVING OPTICAL FIBERS WITH VARIOUS LENGTHS

BACKGROUND OF THE INVENTION

1. Field of the Invention

The present invention relates to optical fiber cables and, more particularly, to optical fiber cables having fibers contained therein having various lengths.

2. Description of the Prior Art

Traditional copper wire communication cable carries a plurality of copper conductors which extend over the entire length of the cable. When such communication cables are used for outside plant systems and subscriber loops, a particular size cable having a predetermined number of conductors is used between termination points. At a point where lines are dropped to local homes or buildings, or to terminals in a subscriber loop, a splice is made to a separate smaller sized cable to facilitate the continuation of the fewer number of copper conductors to the next termination point. Thus, as one proceeds along the transmission line, the number of conductors is reduced at each termination point. This procedure of using progressively smaller-sized cables does not create any significant problem, since copper conductors can be easily spliced without significant signal loss or expense.

With optical fibers, the above method of providing outside plant systems and subscriber loops is not practical or cost effective. The continuing fibers of one cable cannot be easily spliced to the fibers of a smaller cable without realizing undesirable signal attenuation at the splice points and considerable costs.

In an effort to reduce splice cost and signal loss, an alternative was used in some cases. A single large-sized optical fiber cable was used throughout a distribution system. The cable contained the maximum number of optical fibers required, so that the need for splicing would be eliminated. At a termination point, a particular fiber or fibers would be accessed from the cable. The fiber or fibers would be cut and connected to a local terminal or cable. The remaining fibers would be undisturbed and would continue along the remaining length of the cable. However, the remaining length of the accessed fibers would be unused and wasted.

A significant cost of an optical fiber cable resides in the cost of the optical fibers contained therein. In the above-mentioned arrangement, a large portion of the fiber remained unused downstream from the termination points and represented a waste of expensive fiber, the cost of which was included in the overall cable cost.

Assuming an even distribution of termination points along the length of a fiber optic cable, fifty percent of the fiber contained within the cable would be unused and wasted. This unused fiber would represent a high percentage of the overall cost of the cable. Thus, while this alternative reduced splice cost and signal loss, a significant cost in unused fibers was realized.

SUMMARY OF THE INVENTION

The present invention contemplates an optical fiber cable wherein individual fibers or groups of fibers are terminated within the cable at selected locations along the length of the cable. The cable is provided with external and internal indicia identifying the various termination points and the direction in which the fiber extends in the cable.

The cable can be provided with fibers of various lengths, with fiber(s) or groups of fibers terminating at preset intervals. The fiber length intervals can be periodic or systematic for a general design solution, or dictated by the customer's facility into which the cable is installed.

It is anticipated that the present invention would be applicable for use with many different forms of optical fiber cables, including loose tube, open channel and ribbon-type cables.

It is a primary objective of the present invention to reduce the installed cost of optical fiber cables used for outside plant applications and subscriber loops.

It is another objective of the present invention to eliminate a significant amount of the unused fiber in an optical fiber cable.

It is another objective of the present invention to reduce splicing and connectorization costs of installed fiber optic cables.

DESCRIPTION OF THE DRAWINGS

FIG. 1 shows a graphic example of how optical fibers may be terminated at various lengths within an optical fiber cable.

FIG. 2 is a perspective cutaway section of a loose-tube optical fiber cable.

FIG. 3 is a perspective cutaway section of an open-channel optical fiber cable.

FIG. 4 is a perspective cutaway section of a ribbon-type optical fiber cable.

DETAILED DESCRIPTION OF THE INVENTION

It is contemplated that cable constructed in accordance with the present invention could be designed with fiber lengths terminating at predetermined fixed intervals, such as that illustrated in the FIG. 1, wherein a cable having a length of 2,400 meters and an initial fiber count of 144 fibers is illustrated. All 144 fibers run for the initial 200 meter length of the cable, at which position 12 fibers would be terminated, and the cable would be marked both inside and outside the cable jacket identifying the termination point. The remaining fibers would continue for another 200 meters, at which point an additional 12 fibers would be terminated. This procedure would be repeated so that 12 of the fibers are terminated at each 200 meter interval along the entire length of the cable. From the graphic illustration shown in the figure, it is evident that approximately fifty percent of the fiber length could be saved using the present invention. Of course, it is to be understood that the intervals need not be fixed but could vary, as could the number of fibers terminated at each interval.

It is also contemplated that customized cables could be manufactured providing fiber termination points in accordance with the requirements of a particular installation, as, for example, in a subscriber loop extending throughout a customer facility or a planned neighborhood.

The present invention may be practiced using a number of different embodiments representing different types of optical fiber cables, including loose tube and open channel type cables, as illustrated in U.S. Pat. No. 4,682,850 issued July 28, 1987, and a ribbon-type cable, as illustrated in U.S. Pat. No. 4,078,853 issued Mar. 14, 1978.

FIG. 2 illustrates the construction of a loose-tube cable having a central strength member 10 which may be covered with a jacketing material 12. Disposed about the central strength member in either helical or reverse helical fashion are a plurality of buffer tubes 14. Disposed within the buffer tubes are optical fibers 16. The number of optical fibers disposed in each buffer tube may vary depending upon the requirements of the particular cable. The buffer tubes 14 are wrapped with a binder tape 18 which is further surrounded by a polyethylene inner jacket 20 and an outer jacket 22. Ripcords 24 may be provided to facilitate removal of the jackets.

In the present invention, indicia 26 are provided on the outer jacket 22 to indicate the location of a fiber termination within the cable and the direction in which the fiber extends. A number of different indicia may be used to identify the particular fiber that is terminated at the particular location. It is contemplated that the indicia could comprise a number identifying the particular fiber that is terminated at that location. A second set of indicia 28 may be provided on the buffer tubes 14 to further indicate fiber termination locations in a buffer tube.

The invention is equally applicable to a low-cost, low fibercount cable where a single buffer tube is used in a cabling construction. In such a cable, axially disposed strength members run parallel to the buffer tube and are encapsulated in an outer jacket.

FIG. 3 illustrates an open-channel cable having a central strength member 10 comprising a plurality of individual strength members such as steel wires. Disposed about the central strength member 10 is a central core profile 30 formed with a plurality of channels 32 for receiving optical fibers 34. Disposed about the core profile 30 is a binder tape 18 for holding the fibers within the channels. A polyethylene jacket 20 is thereafter provided. A first indicia 26 is provided on the jacket to indicate a termination point of an optical fiber, and a second inner indicia 28 is provided on the core profile 30.

FIG. 4 illustrates a ribbon-type cable having optical fibers 34 disposed within individual ribbons 36 which are layered to form a stack 38 of ribbons. The stack 38 is loosely disposed within a hollow tube 40 which is covered by an outer jacket 42. The outer jacket 42 has provided thereon first indicia 26 to indicate a termination location of an optical fiber, while the individual ribbons 36 additionally include indicia 28 indicating a fiber termination.

In an open-channel cable, only the sheathing or cable jacket must be removed over a short length to access a particular fiber disposed within one of the cable channels. In the loose tube cable and a single tube cable, a particular buffer tube must first be accessed and then the fiber within the selected buffer tube. To facilitate access to the fiber an optical fiber access tool, such as that illustrated in U.S. patent application Ser. No. 081,949, filed Aug. 5, 1987, may be used. An optical fiber access tool as described in said U.S. patent application is sold by Alcatel Cable Systems, Claremont, N.C. under the designation 'Pocket Shaver'.

When accessing a ribbon-type cable, an entire ribbon from a multi-layered ribbon cable may be accessed, or an individual fiber could be accessed by stripping a single fiber from a ribbon and thereafter removing the protective coating therefrom.

With taped ribbons, the tape can be peeled from the coated fiber. For ribbons formed with adhesive or curable material, the individual coated fibers can be separated for access and splicing.

In the cable of the present invention, all the fibers disposed within a channel, loose tube or ribbon may be terminated at a single location; or the individual fibers within a channel, loose tube or ribbon may have different lengths, each terminating at different locations along the length of the cable.

The overall size of the cable could be reduced as a particular buffer tube or ribbon is no longer required. Alternatively, the empty buffer tube, ribbon or filler could continue without the fiber. The buffer tubes and ribbons are made of relatively low cost materials compared to fiber, and the cost of the cabling apparatus needed to terminate a buffer tube and to reduce the cable diameter would far outweigh any material savings. In addition, maintaining a constant cable diameter is advantageous when splice accessories require a particular cable diameter.

As illustrated in the figures, the cable includes both inside and outside indicia to identify the positions at which the fibers terminate. In a loose-tube cable the termination of the various fibers within a tube could also be indicated on each individual buffer tube. In a like manner, the termination of a fiber within a ribbon of a ribbon-type cable could also be indicated on each individual ribbon. In an open channel cable the central core profile would be provided with the inner indicia.

The internal indicia can be provided as a remotely detectable element. Such an element may be a section of metal within a dielectric cable. This metallic section would be located using conventional metal detecting equipment.

The cables are fully jacketed, and access to the fibers at the different termination points will be facilitated by removal of the jacketing layers in the normal manner familiar to those skilled in the art. After a length of the fiber is pulled out of the cable, the cable may be resealed using any of a number of common techniques well known to those skilled in the art. As for example, the cable may be resealed using a shrink tube such as the TWST telephone wire splice tubing sold by Raychem Corp., or the XAGA PreTerm or TPT splice closure systems sold by Raychem Corp. Alternatively, housings could be provided to encapsulate the access point. Such housings would be similar to the 2178 splice case sold by Raychem Corp., or the field splice organizer sold by Alcatel Cable Systems.

Thus, the present invention provides for the construction of optical fiber cable having various fiber lengths contained therein, which fibers may be terminated at predetermined incremental intervals or may be terminated at customized locations, depending upon the ultimate use of the cable. Savings can be realized by reducing splicing costs or eliminating the unnecessary fiber that is customarily provided within the cable. Such savings are significant, since the cost of the fiber is a major component of the overall cable cost.

What is claimed is:

1. An optical fiber cable having a predetermined length, comprising:
   a cable jacket of said predetermined length and having first and second ends;
   a plurality of optical fibers disposed within and enclosed by said cable jacket, said fibers having first and second ends, the first end of each said fiber being coincident with the first end of said cable jacket, said fibers having various lengths such that the second ends of said fibers are located at various positions along the length of said cable, at least one of said second ends being at a position enclosed by the cable jacket; and first indicia disposed on an outer surface of said cable jacket identifying the positions of the second ends of said fibers.

2. An optical fiber cable as described in claim 1, additionally comprising second indicia provided inside said cable jacket to identify the location of said second ends.

3. An optical fiber cable as described in claim 2, wherein the indicia identifies the actual fiber being terminated at the position.

4. An optical fiber cable as described in claim 2, wherein the indicia also indicate the direction in which the fiber extends.

5. An optical fiber cable as described in claim 2, wherein the second indicia is remotely detectable from outside the cable jacket.

6. An optical fiber cable as described in claim 1, wherein the second ends of said fibers are disposed at fixed incremental positions along the length of said cable.

7. An optical fiber cable as described in claim 6, wherein a plurality of fibers have second ends terminating at the same position.

8. An optical fiber cable as described in claim 1, wherein the optical fiber cable is a loose-tube cable and said cable additionally comprises a plurality of buffer tubes, said fibers being disposed within said buffer tubes.

9. An optical fiber cable as described in claim 8, additionally comprising second indicia, identifying the second ends of said fibers, provided on each of said buffer tubes.

10. An optical fiber cable as described in claim 1, wherein the optical fiber cable is an open channel cable and said cable additionally comprises a central core profile member having channels formed therein, said optical fibers being disposed in said channels.

11. An optical fiber cable as described in claim 10, additionally comprising second indicia, identifying the second ends of said fibers, provided on the central core profile member.

12. An optical fiber cable as described in claim 1, wherein the optical fiber cable is a ribbon-type cable having a number of ribbons.

13. An optical fiber cable as described in claim 12, additionally comprising second indicia, identifying the second ends of said fibers, provided on the ribbons of the ribbon cable.

14. An optical fiber cable as described in claim 1, wherein the cable is designed for a custom installation and the second ends of the fibers are disposed at locations along the length of the cable determined by the requirements of the specific installation.

15. An optical fiber cable as described in claim 1, wherein the indicia identifies the actual fiber being terminated at the position.

16. An optical fiber cable as described in claim 1, wherein the indicia also indicate the direction in which the fiber extends.

17. An optical fiber cable as described in claim 1, including at least one additional optical fiber having a first end no coincident with the first end of the cable jacket.

18. An optical fiber cable as described in claim 17, additionally comprising first and second indicia disposed on an outer surface of said cable jacket identifying the positions of the first and second ends of said fibers.

19. An optical fiber cable as described in claim 18, wherein the indicia also indicate the direction in which the fiber extends.

20. An optical fiber cable having a predetermined length, comprising:

a cable jacket of said predetermined length and having first and second ends; and a plurality of optical fibers disposed within and enclosed by said cable jacket, said fibers having first and second ends, the first end of each fiber being coincident with the first end of said cable jacket, said fibers having various lengths such that the second ends of a second plurality of said fibers are each located at a different position along the length of said cable, so that the second ends of any two of said second plurality of fibers do not terminate at the same position along the length of the cable, said second plurality of ends being at positions enclosed by the cable jacket.

* * * * *